(No Model.)
J. E. GILES.
UNDERGROUND CONDUIT FOR ELECTRIC CONDUCTORS.
No. 288,790. Patented Nov. 20, 1883.
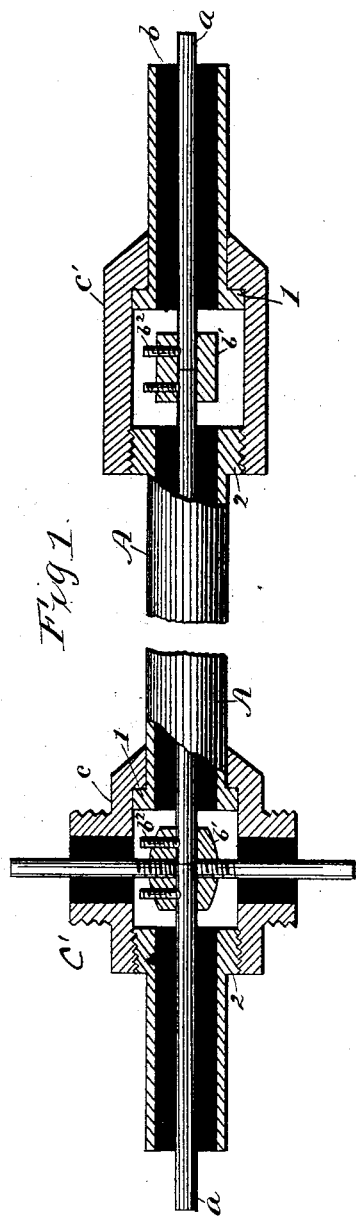
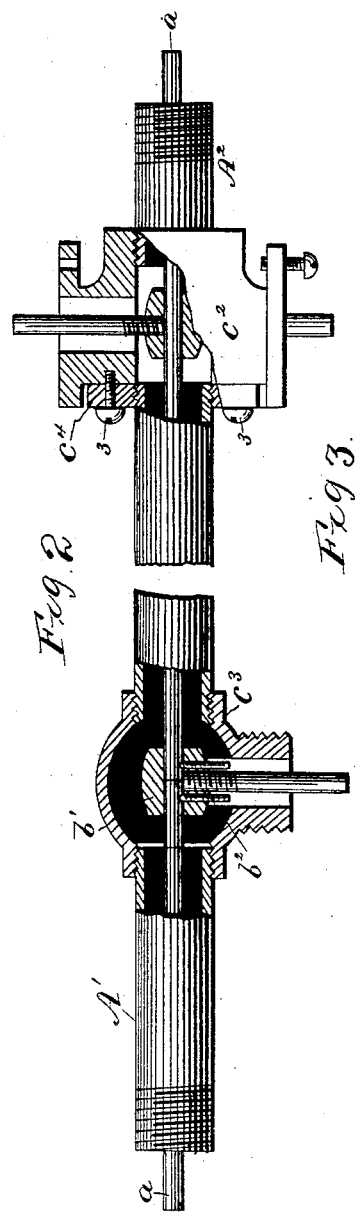
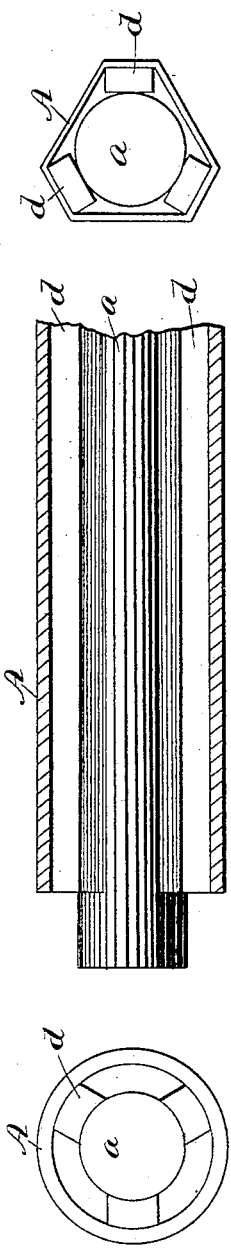
WITNESSES
Chas. R. Burr
Edward E. Ellis
INVENTOR
J. Edwin Giles
per O. E. Duff
Attorney

UNITED STATES PATENT OFFICE.

J. EDWIN GILES, OF HAZLETON, PENNSYLVANIA.

UNDERGROUND CONDUIT FOR ELECTRIC CONDUCTORS.

SPECIFICATION forming part of Letters Patent No. 288,790, dated November 20, 1883.

Application filed September 11, 1883. (No model.)

*To all whom it may concern:*

Be it known that I, J. EDWIN GILES, of Hazleton, in the county of Luzerne and State of Pennsylvania, have invented certain new and useful Improvements in Underground Conduits for Electric Conductors; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My improvements relate to underground conduits for electric conductors, having for their object to provide novel and simple coupling devices for uniting both the sections of conduit and their inclosed conductors, and also to provide means for insulating the conductors from their inclosing-tube, whereby the speed with which the same can be laid is increased and the greatest simplicity and cheapness of cost obtained.

To these ends the invention consists in such details of construction as will be hereinafter more particularly described, and pointed out in the claims.

I use, preferably, a single metal conductor inclosed within a metal tube and insulated therefrom by any suitable insulating material, the conductor in all cases being longer than the tube—that is, to project beyond the length of tube at both ends when the same is placed therein and insulated from said tube. When the ends of two conductors are brought together so as to abut, a loose metal sleeve is slipped over the two ends, leaving the joint midway between the two ends of the sleeve, and two cone-pointed set-screws, with which the sleeve is provided, are driven into the conductors, thus securing a rigid joint and a continuous conductor. When conductors are to lead off from the main line, I put on a sleeve that is drilled and screw-threaded at right angles to the main conductor, into which one or more conductors are screwed. In my conduit I use pipe of any length joined together by flange, union, or sleeve branch couplings, or when no branch connection is ever likely to be made with the main line I join the pipe with a long and specially-designed union-coupling, that in no case allows the ends of the pipe on which it acts to abut.

In the accompanying drawings, Figure 1 is a longitudinal plan with the couplings in section. Fig. 2 is a like view, partly in section; and Fig. 3 shows a view in several details of the means I employ for maintaining the conductor in the center of the tube when the insulating material is applied.

A is a metal pipe or conduit, in which is placed the conductor $a$, and insulated therefrom by any suitable insulating material, $b$. The conductor $a$ will in all cases extend beyond the end of the pipe A.

$b'$ is a sleeve-coupling for uniting the ends of the conductor, provided with conical-pointed set-screws $b^2$, for securing the ends together. In most cases these couplings are drilled and threaded for the reception of branch conductors, the ends of the said branch or cross conductors being threaded and screwed into the coupling.

$c$ is a union branch, which is adapted to receive on its threaded branches a union-coupling, as represented at C', which coupling C' is of sufficient length and internal diameter to leave the conductor-coupling free from contact with the pipe or outside coupling. It will be noticed that the end of one section of conduit held by the coupling has a smooth flange, 1, while the end of the other section is provided with a screw-threaded flange, 2, and also that the coupling proper is provided with an inner flanged and screw-threaded end.

$C^2$ is a flange-coupling, which, when screwed on the raised thread of pipe $A^2$, will run free of its thread back on said pipe, and when the coupling of the conductor is completed $C^2$ is run out again on the thread of $A^2$ until $C^2$ and flange $C^4$ of A are brought together, which are then secured by screws 3. The branch conduits are connected in the same manner.

$C^3$ is a branch sleeve, which can be put in place, if desired, before the conductor is insulated from the pipe, and then filling both pipe and coupling with the insulation, after the branch conductor is screwed in, or on the end of each length branch sleeve $C^3$ is placed. Conductor-sleeve and branch conductor are screwed in place, a plug containing a false conductor slightly larger than the conductor proper is screwed into the open end of C³, and around the branch conductor is placed a false plug, to be withdrawn when the insulation shall have solidified, giving an opportunity to manipulate the set-screws. Pipe A' then, with its projecting conductor, is inserted in C³, from where the plug has been withdrawn, and screwed to place. The conductors will freely revolve in sleeve b' until their ends abut. Then the set-screws are tightened. The space between the branch conductor and sleeve branch is closed with any suitable non-conducting material. The branch is then continued like the main; or, if the branch is not to be used, it will be closed with a screw plug or cap.

The details of Fig. 3 illustrate my mode of maintaining the conductors in the center of the tubes while the said tubes are being filled with insulating material. d d represent strips of wood or other non-conducting material, to be of the same length as the tube in which they are placed. Three or more of these are bound to the conductor a in any suitable manner, and the conductor and strips inserted in the tube, the strips securing the wire centrally therein. The space within the tube and around the strips and conductor is then filled with insulating material, preferably in a liquid state, that will harden on cooling. I find in using washers for this purpose that the washers must be placed quite close together, or the diameter of the pipe must be great compared to the diameter of the conductor, otherwise there is danger of the conductor coming in contact with the pipe. To obviate this danger, to hasten the speed with which conductors can be insulated from their inclosing-tube, and to lessen the cost of preparation, I use three or more cheap strips of any non-conducting material in the manner explained.

Having thus described my invention, what I claim is—

1. In underground conduits, the combination of electric conductors held centrally within a pipe by non-conducting strips, with the sleeve b', constructed to connect said conductors and any branches thereof, and provided with conical set-screws, as described, and the flanged branch coupling for connecting the ends of the main and branch pipes, said coupling designed to prevent the ends so connected from abutting, all constructed substantially as and for the purpose set forth.

2. In underground conductors, the tube having extending through and beyond the ends thereof a conductor supported centrally therein by the non-conducting strips, as described, in combination with the sleeve b', for connecting the conductors, and the sleeve-coupling for uniting the ends of the tubes, said coupling designed to keep the tubes from abutting, substantially as set forth.

3. In underground conductors, the combination, with an electric conductor in its inclosing-conduit, of strips of non-conducting material secured to said conductor, substantially as and for the purpose described.

4. In underground conductors, the combination of an electric conductor within a pipe, with strips of non-conducting material bound to said conductor, said pipe and its couplings being filled with insulating material, substantially as described.

In testimony that I claim the foregoing as my own I hereunto affix my signature in presence of two witnesses.

J. EDWIN GILES.

Witnesses:
W. F. MARTZ,
G. F. KISNER.